United States Patent [19]

Nims

[11] Patent Number: 4,580,406
[45] Date of Patent: Apr. 8, 1986

[54] ENVIRONMENTAL CONTROL SYSTEM

[75] Inventor: Robert A. Nims, Torrance, Calif.

[73] Assignee: The Garrett Corporation, Los Angeles, Calif.

[21] Appl. No.: 678,629

[22] Filed: Dec. 6, 1984

[51] Int. Cl.⁴ .............................................. F25B 9/00
[52] U.S. Cl. ........................................ 62/87; 62/402
[58] Field of Search ..................... 62/401, 402, 86, 87, 62/88

[56] References Cited

U.S. PATENT DOCUMENTS

| | | | |
|---|---|---|---|
| 2,469,375 | 5/1949 | Flagle | 230/1 |
| 2,648,193 | 4/1953 | Redding et al. | 60/39.09 |
| 2,705,866 | 4/1955 | Quinby et al. | 60/39.09 |
| 2,732,125 | 1/1956 | Ruby | 230/115 |
| 2,750,737 | 6/1956 | Leigh | 60/39.09 |
| 2,868,483 | 1/1959 | Krueger | 244/134 |
| 2,940,258 | 6/1960 | Lombard et al. | 60/39.66 |
| 2,965,285 | 12/1960 | Schorn et al. | 230/114 |
| 3,058,305 | 10/1962 | Leigh, Jr. | 60/39.39 |
| 3,107,489 | 10/1963 | Palfreyman | 60/39.14 |
| 3,123,283 | 3/1964 | Leis | 230/114 |
| 3,236,499 | 2/1966 | Chatfield et al. | 253/26 |
| 3,262,636 | 7/1966 | Palfreyman | 230/132 |
| 3,327,932 | 6/1967 | Brodell | 230/114 |
| 3,511,576 | 5/1970 | Herbstritt et al. | 415/27 |
| 3,586,458 | 6/1971 | Avery | 415/28 |
| 3,587,243 | 6/1971 | Keller et al. | 62/402 |
| 3,945,759 | 3/1976 | Bobo | 415/145 |
| 4,198,830 | 4/1980 | Campbell | 62/87 |
| 4,214,436 | 7/1980 | Romeyke et al. | 60/39.09 |
| 4,334,411 | 6/1982 | Payne | 62/402 |
| 4,352,273 | 10/1982 | Kinsell et al. | 62/87 |
| 4,374,469 | 2/1983 | Rannenberg | 62/402 |
| 4,444,018 | 4/1984 | Kinsell et al. | 62/402 |

FOREIGN PATENT DOCUMENTS 201508  4/1956  Australia .

Primary Examiner—Ronald C. Capossela
Attorney, Agent, or Firm—James W. McFarland; Albert J. Miller

[57] ABSTRACT

Apparatus and method for conditioning a flow of working fluid includes a parallel, bypass anti-icing flow of warm fluid which is induced and automatically controlled in relation to critical system operating parameters while minimizing parasitic power losses to improve overall system efficiency.

22 Claims, 4 Drawing Figures

ENVIRONMENTAL CONTROL SYSTEM

BACKGROUND OF THE INVENTION

This invention generally relates to fluid conditioning apparatus and method and relates more particularly to improved techniques for inhibiting ice formation in such systems.

Fluid conditioning systems are utilized, by way of example, in aircraft to provide a conditioned airflow to the passenger or pilot cabins or to other locations in the aircraft requiring a controlled atmosphere. Typically such systems draw a pressurized source of air, either from the aircraft engine or other compressing source on board the aircraft for conditioning as to temperature and as to moisture content. Other functions accomplished by such a fluid conditioning system may include removal of contaminants or other undesirable elements in the airflow. In a closed system such as in an aircraft, tank or other occupied vehicle, system efficiency, weight, and simplicity become paramount designed considerations. Examples of such fluid conditioning systems may be found in U.S. Pat. Nos. 4,198,830 of Campbell, U.S. Pat. No. 3,452,273 of Kinsell et al, and U.S. Pat. Ser. No. 4,507,939 of Wieland having common assignee herewith.

For system efficiency and economy of weight it is typical in such fluid conditioning systems to utilize a turbine expander for heat removal from the airflow. Maximal efficiency is obtained by a large reduction in temperature of at least a portion of the airflow and subsequent mixing of the cold airflow with a warm airflow source. Higher system efficiencies in heat removal furthermore dictate higher pressure systems. High pressure systems such as described in the above referenced U.S. Pat. No. 4,507,939 typically include water condensation and moisture removal elements. However, even with utilization of such techniques the system is subject to ice formation under certain conditions of critical operation.

Previous anti-icing techniques for inhibiting a formation of ice within the system are inherent parasitic power losses reducing the overall system efficiency. Previous attempts to deal with this problem have been faced with the choice of either accepting a substantial parasitic power loss to maintain system simplicity, or introducing relatively complex, expensive and/or weight increasing elements and subsystems for controlling the anti-icing arrangement to minimize power consumption thereof.

SUMMARY OF THE INVENTION

It is the primary object of the present invention to provide apparatus and method for a fluid conditioning system of the type described with improved anti-icing techniques with minimum performance penalties on the system from the standpoint of parasitic power loss, weight, system complexity and cost.

More particularly, it is an object of the present invention to provide an anti-icing flow of warm air presently available in the fluid conditioning system for use in preventing ice formation therein, which utilizes energy normally lost from the system as the power source for driving the anti-icing airflow.

Another important object of the present invention is to provide an anti-icing apparatus and method as set forth in the preceding paragraphs, wherein the anti-icing airflow is controlled in volume in relation to the operating parameters of the system to provide the anti-icing airflow only when required in order to minimize the parasitic power loss from the system.

More particularly the preceding objects and advantages are accomplished by utilizing an existing pressure differential in the conditioned airflow within the fluid conditioning system as the power source for the anti-icing airflow, the magnitude of the pressure differential being related to critical operating parameters of the system and more particularly related to the critical operational points in the fluid conditioning system most conducive to ice formation therein.

Briefly, the present invention contemplates a fluid conditioning system having an inlet airflow of relatively warm air which is directed through a control valve that varies and adjusts the airflow through the system, and subsequently into heat exchange relationship with a heat sink and then a turbine expander for the removal of heat from the airflow. Relatively cold temperatures, perhaps as much as $-10$ degrees to $-30$ degrees F. may be experienced in the air flow during its expansion at the turbine expander. To prevent ice formation at the turbine expander or other location within the fluid conditioning system, the present invention contemplates a bypass passage for directing relatively warm airflow from upstream of the control valve to a plenum disposed in heat exchange relationship with the location (such as at the turbine expander) subject to ice formation. The anti-icing airflow is exhausted from such plenum and back into the flow of airflow in the fluid conditioning system at a point downstream of the control valve. In this manner the pressure differential developed across the control valve provides the power source for inducing the anti-icing airflow. Because the conditions most conducive to ice formation in the fluid conditioning system are prevalent while the control valve is substantially throttling airflow therethrough, the anti-icing airflow is automatically controlled in relation to the requirements of the overall fluid conditioning system.

These and other objects and advantages of the present invention are specifically set forth or will become apparent from the following detailed description of a preferred form of the invention when read in conjunction with the accompanying drawings.

DETAILED DESCRIPTION OF THE INVENTION

Figure 1:
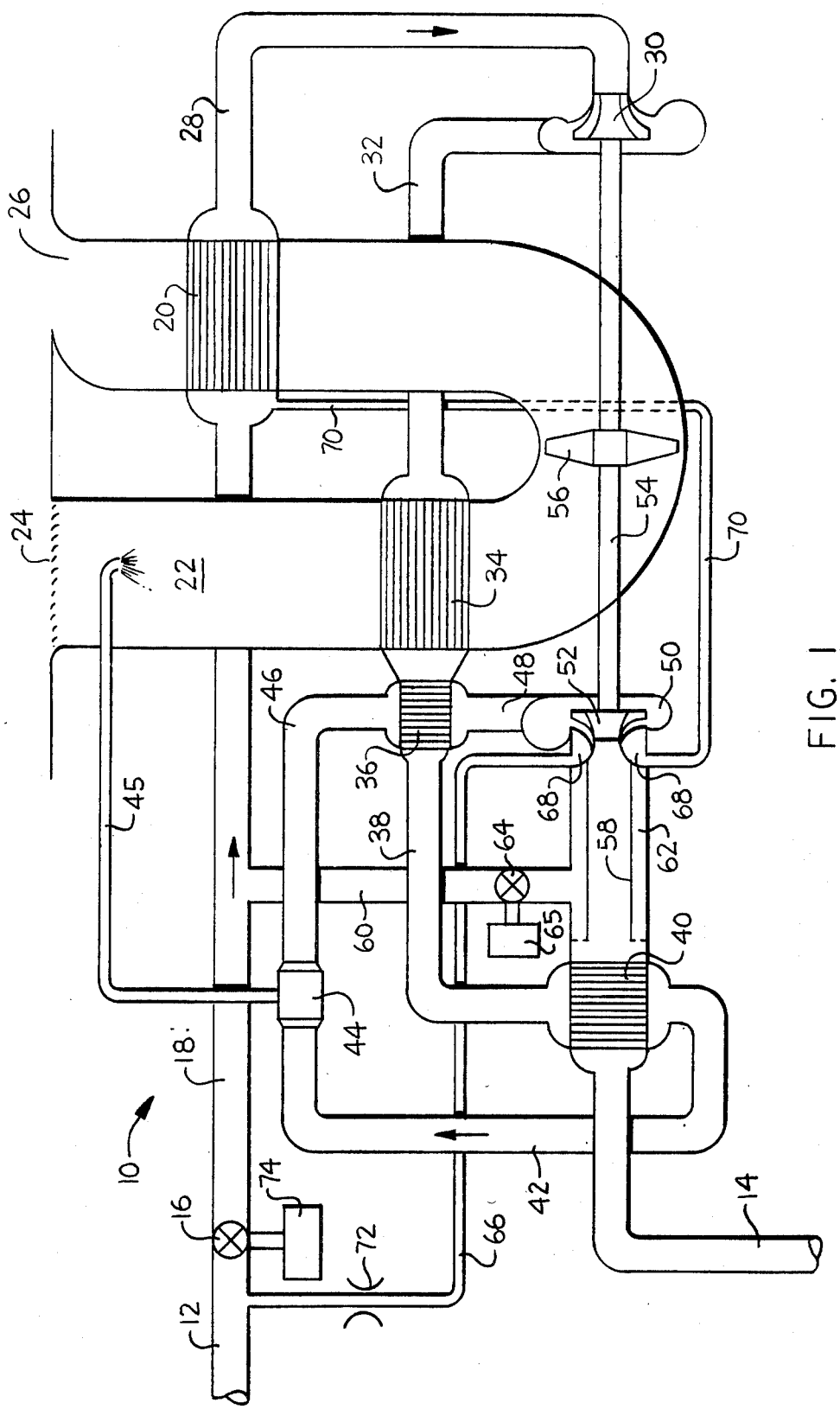
FIG. 1 is a schematic representation of a fluid conditioning system constructed in accordance with the principles of the present invention.

Referring now more particularly to the drawings, in FIG. 1 is illustrated a system 10 for conditioning a working fluid, the system shown being an environmental control system as may be utilized in aircraft. System 10 includes a fluid flow path leading from an inlet duct 12 ultimately to an outlet duct 14 from which the conditioned airflow is directed to a point of use within the aircraft. Control valve means in the form a flow control or pressure control valve and shutoff device 16 is interposed in the inlet duct 12 for adjusting the rate of working fluid flow delivered through a first duct 18 toward the heat pass side of a primary or first heat exchanger 20. Heat exchanger 20 acts as a heat sink having a cool path side carrying a flow cooling air. This cooling air may be ambient air delivered through a cooling passage 22 from an inlet 24 therefor to a outlet 26.

After extraction of a certain amount of heat from the working fluid, it is directed out of heat exchanger 20 through a second duct 28 to the inlet of a rotary compressor 30. From the rotary compresssor 30, the compressed working fluid is delivered through a third duct 32 into the heat pass side of a secondary heat exchanger 34 which is also disposed in the cooling duct 22 in heat exchange relationship with the cooling flow therethrough. From the secondary heat exchanger 34 the working fluid is passed through a reheater heat exchanger 36 and a fourth duct 38 to the inlet of a condenser heat exchanger 40. From the exhaust of heat exchanger 40, the working fluid is directed through a duct 42 toward a water extractor 44. Condensed moisture is removed from the working fluid in water trap 44, and the the excess water may be conveniently expelled through a duct 45 into the cooling passage 22. Exhaust of working fluid from water trap 44 is directed through duct 46 into the cooling side of the reheater heat exchanger 36 for slight reheating of the demoisturized working fluid. From reheater 36 the working fluid then passes through duct 48 to a toroidally shaped inlet duct 50 of a turbine expander 52.

Turbine expander 52 is connected via a drive shaft 54 to drive the rotary compressor 30. Convenine ntly, a central fan 56 is also mounted upon shaft 54 in interposed relationship within cooling duct 22 to develop the cooling airflow through duct 22 to develop the cooling airflow through duct 22 for use in extracting heat from the working fluid in both the primary and secondary heat exchangers 20 and 34.

The working fluid is rapidly expanded and therefore cooled while passing through turbine expander 52 for exhaust through a duct 58 toward the cool side of condenser heat exchanger 40. Exhausting from heat exchanger 40, the working fluid then passes through outlet duct 14 to a point of desired use.

For temperature control, a temperature bypass passage 60 extends from first duct 18 at a point downstream of control valve 16 to intermix with the working fluid at a passage 62 ultimately communicating with passage 58 immediately upstream of the entrance to condenser heat exchanger 40. In a conventional manner the relatively warm airflow through bypass passage 60 is controlled via a temperature control valve 64 having an automatic control 65 associated therewith.

Additionally, the system 10 incorporates a bypass fluid flow path including duct means 66 extending from the inlet duct 12 at a location upstream of control valve 16 to an anti-icing plenum or chamber 68 disposed adjacent the turbine expander 52. This bypass flow path extends onward from anti-icing plenum 68 through a second duct means 70 which communicates with the fluid flow path at a location downstream of control valve 16. In the embodiment illustrated in FIG. 1 the second duct means 70 communicates with the first duct 18 at a location just upstream of primary heat exchanger 20. Disposed in the bypass passage 66 is a fixed flow restrictor 72 schematically illustrated in FIG. 1. The relative size of the bypass passage 66 and/or the fixed flow restrictor 72 is such that the nominal flow to bypass 66 is on the order of 10% or less of the major working fluid flow passing across control valve 16 through the primary fluid flow path of the system. It will be noted that conventionally controlled valve 16 also has a control apparatus 74 associated therewith for actuating control valve 16 to variably restrict fluid flow therethrough and, ultimately, to completely shutoff fluid flow through the flow path.

Figure 2:
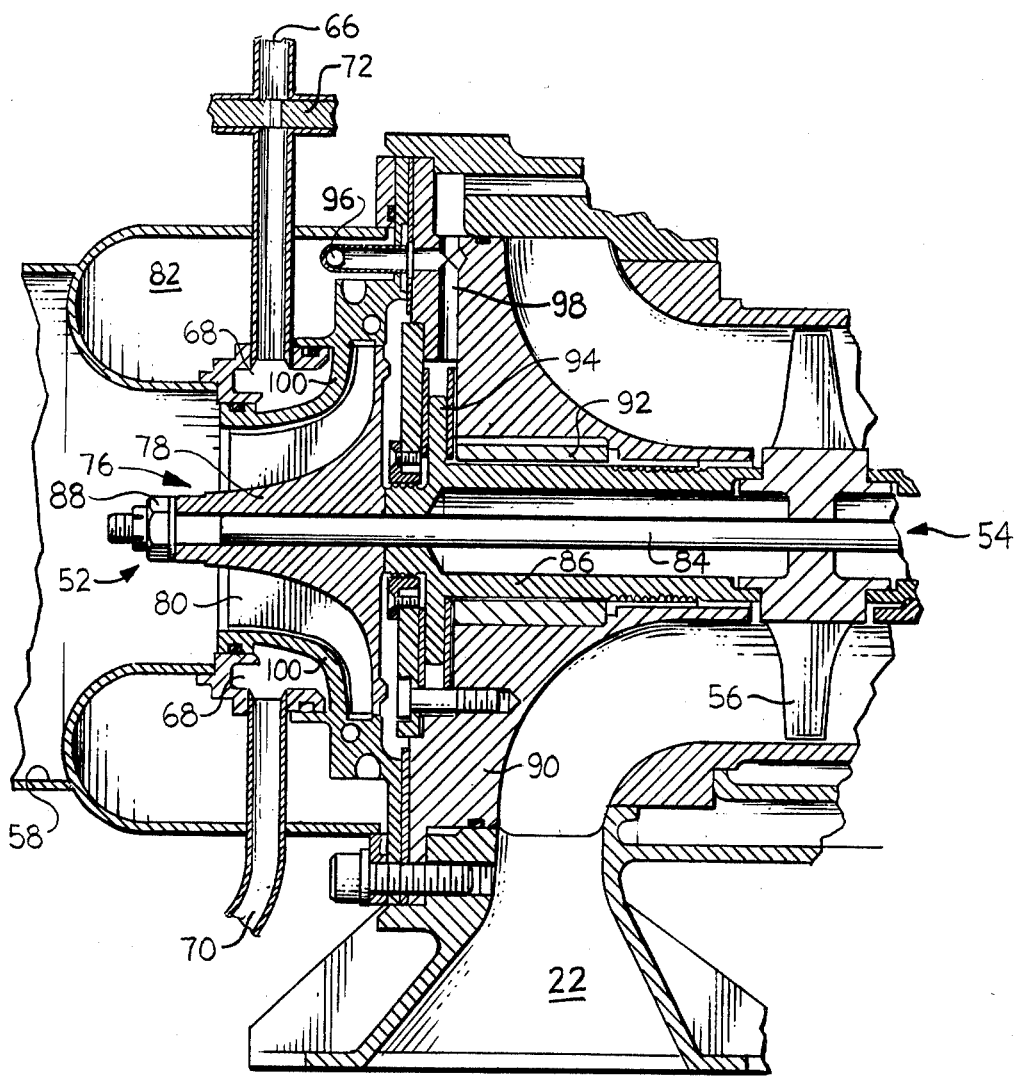
FIG. 2 is a partial longitudinal cross-sectional view of a the turbine expander of FIG. 1.

One embodiment of the rotary turbine expander 52 is illustrated in detail in FIG. 2. More particularly, the rotary turbine expander 52 includes a radial inflow turbine wheel generally designated by the numeral 76, having a central hub portion 78 and a plurality of blades 80 extending radially therefrom. The radial inflow turbine wheel 76 is driven by the working fluid received from its inlet 82 to rotate the shaft 54. In the embodiment illustrated the shaft 54 includes an internal shaft 84 and an external shaft portion 86. Secured by nut 88, the radial turbine wheel 76 is frictionally held to drive the outer portion 86 of the turbine wheel upon which is also mounted the central fan 56. Not illustrated in FIG. 2 is the compressor wheel 30 secured to shaft portions 84, 86 by a nut to complete the frictional interlocking of the turbine, compressor, and fan 56 on the shaft.

As illustrated in FIG. 2, the associated housing structure 90 defines the cooling path 22 through which the cooling ambient airflow is induced by the central fan 56. Also the housing structure 90 associated with the turbine expander carries compliant, multi-leafed, foil journal bearings 92 and a thrust foil bearing 94 which rotably support the shaft 54 and the rotating turbine expander 52. Being air bearings, the foil bearings 92 and 94 receive a supply of pressurized fluid from a pickup 96, and internal duct 98 for delivery to the thrust bearing 92 and journal bearing 94.

The first duct means 66 extends inwardly to plenum 68 which is annular in configuration and substantially surrounding the blades 80 of the turbine wheel 76. A shroud or shroud wall 100 is disposed closely adjacent the blades of the turbine wheel 76 and in heat exchanger relationship with the plenum 68 therebehind. The anti-icing flow delivered from passage 66 across fixed flow restrictor 72 to chamber 68 acts to warm the shroud wall 100 to prevent formation of ice adjacent the blades to the turbine expander 52.

In operation of the system illustrated in FIGS. 1 and 2, relatively warm working fluid is delivered from inlet passage 12 to be throttled across control valve 16 for subsequent passage through the fluid flow path and ultimate delivery to outlet 14 to a point of use. The pressure differential developed across control valve 16 due to the throttling of working fluid therethrough develops the pressure differential across the control valve 16 which induces a fluid flow through passage 66, across restrictor 72 into the anti-icing plenum chamber 68. Exhaust of the anti-icing fluid flow to plenum 68 passes through passage 70 back to the inlet duct 18 at a location downstream of control valve 16. In this manner the present invention utilizes a parasitic power loss, in the form of pressure differential developed across control valve 16, to drive anti-icing flow of working fluid to the plenum 68.

Plenum 68 acts to maintain shroud 100 at relatively warm temperature such that ice may not form at this location in the fluid flow path. It has been found in high performance fluid conditioning systems of the type described, that the actual temperature adjacent the turbine expander, and particularly at the blades, may reach temperatures of −10 degrees to −30 degrees F. In the absence of anti-icing techniques thereat, such low temperatures may create formation of ice at shroud 100. Of course, this can be highly deleterious to the operation of the system due to the very high rotational speed of the rotary turbine expander 52 (100,000 rpm or higher). In particular, such ice and contact therewith by the turbine expander 52 imposes serious side loads which can destroy the bearings 92 and 94 causing complete malfunction of the rotating machinery.

Due to the configuration and arrangement of the anti-icing bypass passages 66 and 70, the magnitude of the pressure differential developed across control valve 16 determines the magnitude of the bypass airflow directed through anti-icing chamber 68. It has been found that the primary conditions which are most conducive to ice formation correspond to the operation of the fluid conditioning system when valve 16 is substantially throttling fluid flow therethrough and developing a substantial pressure differential thereacross. Accordingly, the present invention utilizes the pressure differential existing across the control shutoff valve 16 to control the magnitude of the anti-icing airflow. In this manner the present invention provides an anti-icing flow which is controlled automatically in volume in relation to the critical operating parameters of the overall system in order minimize parasitic power loss generated by the anti-icing airflow, yet without introduction of additional complexity in the control and operation of the system.

More particularly, in the design of the overall fluid conditioning system 10, the heat exchangers must be sized for producing maximum performance of the system which occurs when maximum flow is being permitted across control valve 16 to first duct 18. This occurs, of course, when shutoff valve 16 is minimally restricting fluid flow therethrough. As a result, during throttling condition of control valve 16, which reduces the volume of fluid flow through the conditioning system, the various heat exchangers essentially become oversized relative to the rate of warm airflow therethrough such that extremely cold conditions can develop at different locations in the fluid flow path. Thus, the present invention which develops substantial anti-icing flow only in a condition where substantial throttling is being developed by control valve 16, automatically minimizes the anti-icing airflow to that required by the system, and only when required by the system.

While in the FIG. 1 and FIG. 2 embodiment the location at which the anti-icing airflow is placed in heat exchange relationship with the primary fluid flow path is adjacent the turbine expander, it will be recognized that the present invention may be utilized to provide anti-icing at other locations in the fluid flow path where icing may occur. For example, the present invention may be utilized to direct an anti-icing flow to the inlet of the condenser heat exchanger 40 where icing conditions might occur.

Figure 3:
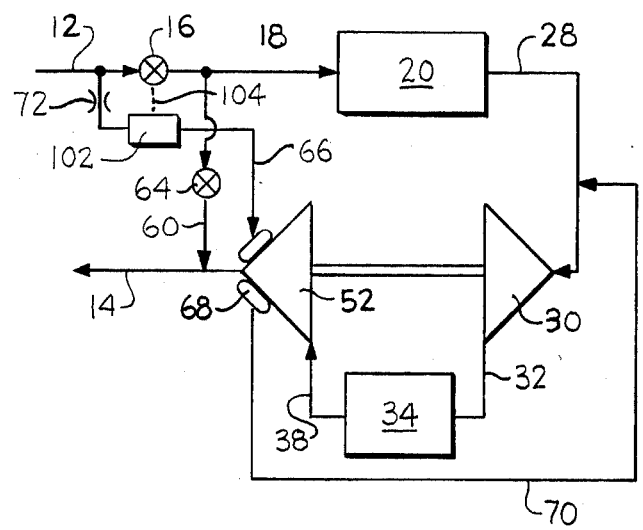
FIG. 3 is a simplified schematic of an alternate form of the present invention.

FIG. 3 illustrates another form of the invention, and in this illustration several of the components are eliminated for purposes of simplification. Illustrated in FIG. 3 is the inlet duct 12, control valve 16, first duct 18, primary heat exchanger 20, second duct 28, compressor 30, third duct 32, secondary heat exchanger 34, fourth duct 38, turbine expander 52, and outlet duct 14. Also, in FIG. 3 is illustrated the temperature control bypass duct 60 and associated valve 64. In the FIG. 3 arrangement the first bypass duct means 66 along with fixed flow restrictor 72 are illustrated for delivering the anti-icing airflow to the anti-icing chamber 68, along with the return or second duct means 70 for carrying anti-icing airflow exhausted from chamber 68.

In contrast to FIG. 1 arrangement, the embodiment illustrated in FIG. 3 shows that the second duct means 70 may communicate with the primary fluid flow path at a location downstream of the primary heat exchanger 20 in second duct 28. This arrangement provides greater pressure differential for driving the anti-icing airflow through chamber 68. Additionally, as illustrated in FIG. 3, the present invention may incorporate a flow control shutoff valve 102 in passage 66. Valve 102 may be operationally related to the control valve 16, as illustrated by dashed line 104, such that when control valve 16 is moved to a fully closed position to shutoff any flow to the fluid conditioning system, shutoff valve 102 may also be moved to a fully closed position to also close the anit-icing flow so that no parasitic flow and therefore power losses occur in the fluid conditioning system in the shutoff condition.

Figure 4:
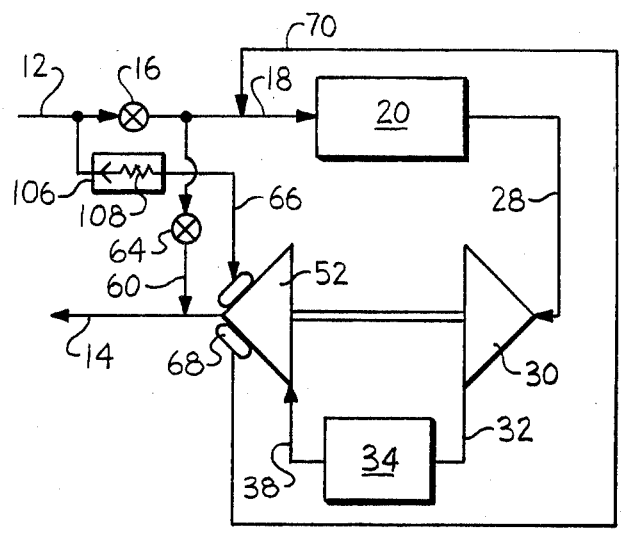
FIG. 4 is another simplified schematic of yet a further form of the present invention.

FIG. 4 illustrates a further embodiment of the system and shows a simplified schematic somewhat similar to FIG. 3. Again, similar reference numerals identify like elements in the FIG. 1 embodiment.

In place of the fixed flow restrictor 72 as shown in the FIG. 1 and FIG. 3 embodiments, the embodiment illustrated in FIG. 4 includes a relatively low pressure relief valve schematically illustrated at 106. Relief valve 106 acts to normally close fluid flow through passage 66 to anti-icing chamber 68 in the absence of a pressure differential across shutoff valve 16 below a predetermined magnitude. When the pressure differential across shutoff valve 16 increases to a level above a predetermined magnitude (normally predetermined by the pretension of a spring 108), the relief valve 106 opens fully to permit anti-icing airflow therethrough. The arrangement of FIG. 4 therefore provides automatic shutoff flow control through the anti-icing passage as provided by the shutoff valve 102 in FIG. 3, and further provides that anti-icing flow occurs only when the control valve 16 is throttling to a substantial, predetermined magnitude.

From the foregoing it will be apparent that the present invention also provides an improved method for conditioning fluid in a fluid flow passage which includes the steps of directing the working fluid through a variable restriction in the form of control valve 16 which controls the flow and develops a pressure differential thereacross. Subsequently the working fluid is cooled downstream of control valve 16 via a heat exchanger 20, and is then further cooled by expansion at a rotary turbine expander 52. The cooling accomplished by the heat exchanger and the turbine expander are capable of inducing ice formation at a location in the fluid path such as at the turbine expander 52. To inhibit formation of ice, the method of the present invention further includes the step of directing a parallel anti-icing flow working fluid from the flow path at a location upstream of control valve 16 into heat exchange relationship with the heat shroud wall 100 at the location where icing may occur. The present invention contemplates utilizing the pressure differential across the control valve 16 to induce and control the parallel anti-icing flow by assuring return of the anti-icing flow to the fluid flow path at a location downstream of the control valve.

Various alterations and modifications of the foregoing detailed description of the preferred forms of the invention will become apparent to those skilled in the art. Accordingly, this detailed description should be considered as exemplary detail and not as limiting to the scope and spirit of the invention as set forth in the appended claims.

Having described the invention with sufficient clarity that those skilled in the art may make and use it, I claim:

1. A system for conditioning working fluid in a fluid flow path, comprising:

control valve means in said path for variably restricting the flow of working fluid through said path;

a rotary turbine expander in said path downstream of said control valve means operable to expand and cool the working fluid;

heat exchange means in said path downstream of said control valve means for extracting heat from the working fluid, said expander and heat exchange means being capable of sufficiently cooling said working fluid to induce ice formation within said path at a location downstream of said control valve means;

means for defining an anti-icing plenum at said location;

first duct means communicating with said plenum and said path at a position upstream of said control valve means for carrying a flow of working fluid to said plenum; and second duct means communicating with said plenum and said path at a position intermediate said control valve means and said expander for permitting exhaust of working fluid from said plenum back to said path, whereby flow of working fluid to said plenum is induced solely by the pressure differential developed across said control valve means.

2. A system as set forth in claim 1, wherein said control valve means and said first and second duct means are relatively arranged and configured whereby the volume of flow of working fluid to said plenum is controlled by the magnitude of said pressure differential.

3. A system as set forth in claim 2, further including a fixed flow restrictor in said first duct means.

4. A system as set forth in claim 3, wherein said location is adjacent to said turbine expander.

5. A system as set forth in claim 4, wherein said turbine expander comprises a radial inflow turbine wheel having a central hub and blades extending from said hub, and a shroud encasing said blades, said plenum being arranged in heat exchange relationship with said shroud.

6. A system as set forth in claim 2, wherein said heat exchange means is disposed upstream of said expander, said second duct means communicating with said path upstream of said heat exchange means.

7. A system as set forth in claim 2, wherein said heat exchange means is disposed upstream of said expander, said second duct means communicating with said path downstream of said heat exchange means.

8. A system as set forth in claim 2, further including a flow shut off valve in said first duct means movable to a closed postion prohibiting flow of working fluid through said first duct means to said plenum.

9. A system as set forth in claim 2, further including a relatively low pressure relief valve in said first duct means movable between open and closed positions when said pressure differential is respectively above and below a predetermined level.

10. A system for conditioning working fluid in a fluid flow path, comprising:

control valve means in said path for variably restricting the flow of working fluid through said path;

a rotary turbine expander in said path downstream of said control valve means operable to expand and cool the working fluid;

heat exchanger means in said path downstream of said control valve means for extracting heat from the working fluid, said expander and heat exchanger means being capable of sufficiently cooling said working fluid to induce ice formation within said path at a location downstream of said control valve means;

means for defining an anti-icing plenum at said location; and anti-icing bypass passage means communicating with said plenum and communicating with said path in parallel flow relationship to the flow of working fluid through said control valve means, for developing an anti-icing flow of working fluid through said plenum controlled by the pressure differential developed across said flow control valve.

11. In an aircraft environmental control system for conditioning a relatively warm airflow for subsequent delivery to a space within the aircraft:

an inlet duct receiving the relatively warm airflow;

a control valve for variably restricting the airflow through said inlet duct;

a heat sink in said inlet duct downstream of said control valve for removing heat from said airflow;

a rotary turbine expander in said inlet duct downstream of said control valve and operable to further remove heat from the airflow;

an outlet duct extending from said turbine expander to the space in the aircraft;

means for defining an anit-icing flow receiving chamber adjacent the outlet of said turbine expander; and an anti-icing bypass duct extending from said inlet duct at a point upstream of said control valve to said anti-icing chamber, and extending from said anti-icing chamber to said inlet duct at a point intermediate said control valve and said turbine expander.

12. In a system as set forth in claim 11, wherein said turbine expander is downstream of said heat sink, and further including a compressor driven by said turbine expander and disposed intermediate said heat sink and said turbine expander for compressing said airflow.

13. In a system as set forth in claim 12, further including a fixed flow restrictor in said anti-icing bypass duct.

14. In a system as set forth in claim 13, wherein said turbine expander comprises a radial inflow turbine wheel having a central hub and blades extending from said hub, and a shroud encasing said blades, said chamber being arranged in heat exchange relationship with said shroud.

15. In a system as set forth in claim 14, wherein said anti-icing bypass duct communicates with said inlet duct upstream of said heat sink.

16. In a system as set forth in claim 12, wherein said anti-icing bypass duct communicates with said inlet duct at a point intermediate said heat sink and said compressor.

17. In a system as set forth in claim 12, further including a flow shut off valve in said bypass duct movable to a closed position prohibiting flow of airflow therethrough.

18. In a system as set forth in claim 12, further including a relatively low pressure relief valve in said bypass passage movable between open and closed positions when the pressure differneital across said control valve is respectfully above and below a predetermined level.

19. A system for conditioning a relatively warm airflow for delivery to a point of use, comprising:
an inlet duct receiving the relatively warm airflow;
a control valve for variably restricting the airflow through said inlet duct;
a heat sink in said inlet duct downstream of said control valve for removing heat from said airflow;
a rotary turbine expander in said inlet duct downstream of said control valve and operable to further remove heat from the airflow;
an outlet duct extending from said turbine expander to the point of use;
means for defining an anti-icing flow receiving chamber adjacent the outlet of said turbine expander; and
an anti-icing bypass duct extending from said inlet duct at a point upstream of said control valve to said anti-icing chamber, and extending from said anti-icing chamber to said inlet duct at a point intermediate said control valve and said turbine expander.

20. In an environmental control system for conditioning a relatively warm airflow:
an inlet passage for receiving inlet airflow;
a control valve for variably restricting and interrupting the airflow from the inlet passage;
a first duct extending from said control valve;
a primary heat exchanger arranged to receive the airflow from said first duct and providing a heat sink to remove heat from the airflow;
a second duct extending from said primary heat exchanger;
a rotary compressor arranged to receive the airflow from said second duct and operable to compress the airflow;
a third duct extending from said compressor for carrying compressed airflow exhausted therefrom;
a secondary heat exchanger arranged to receive the compressed airflow from said third duct and providing a heat sink to remove heat from the compressed airflow;
a fourth duct extending from said secondary heat exchanger;
a rotary, bladed turbine arranged to receive the compressed airflow from said fourth duct and rotatably driven thereby to expand and cool the airflow;
a stationary shroud wall disposed closely adjacent the blades of said turbine;
means cooperating with said shroud wall to define an anti-icing chamber isolated from the flow of working fluid through said turbine, said chamber arranged in heat exchange relationship with said shroud wall;
a shaft operably coupling said turbine and said compressor whereby said turbine rotatably drives said compresssor;
an outlet duct extending from said turbine for carrying the expanded airflow therefrom toward a point of use;
a first anti-icing passage communicating with said chamber and with said inlet passage upstream of said control valve; and
a second anti-icing passage communicating with said chamber and said first duct, whereby pressure differential developed across said control valve induces and controls fluid flow from said inlet duct through said first anti-icing passage, said chamber, and said second anti-icing passage.

21. A method for conditioning a working fluid in a fluid flow path, comprising the steps of:
directing the working fluid through a variable restriction in the flow path to control the flow and develop an associated pressure differential across the variable restriction;
cooling the working fluid downstream of the variable restriction;
further cooling the working fluid by expansion thereof downstream of the restriction, said cooling and further cooling steps being capable of inducing ice formation at a location in said flow path;
directing a parallel anti-icing flow of working fluid from said flow path at a point upstream of the variable restriction into heat exchange relationship with said flow path at said location; and
utilizing said pressure differential to induce and to control said parallel anti-icing flow by returning said parallel anti-icing flow from said location to said fluid flow path at a point downstream of said variable restriction to remix with working fluid in said fluid flow path prior to said further cooling step.

22. A method for conditioning a working fluid in a fluid flow path, comprising the steps of:
variably restricting the flow of working fluid at a first station in said fluid flow path and thus developing an associated variable pressure differential across the first station;
cooling the working fluid at a second station in the fluid flow path;
additionally cooling the working fluid by expansion thereof in a rotary turbine expander disposed at a third station in said fluid flow path, said turbine expander being subject to icing under certain conditions of operation;
directing a parallel, relatively low volume, anti-icing flow of working fluid from said flow path at a point upstream of said first station, into heat exchange relationship with said turbine expander to inhibit said icing; and
utilizing said variable pressure differential to control the magnitude of said anti-icing flow of working fluid.

* * * * *